United States Patent [19]
Goedert

[11] 3,887,900
[45] June 3, 1975

[54] ROTATING BICYCLE SIGNAL AND DRIVE THEREFOR

[76] Inventor: Gerald Lawrence Goedert, 1907 E. Rowland Ave., Camarillo, Calif. 93010

[22] Filed: July 1, 1974

[21] Appl. No.: 484,680

[52] U.S. Cl. .................. 340/134; 116/56; 240/7.55
[51] Int. Cl. ......... B62j 3/00; B62j 5/00; B60q 1/26
[58] Field of Search ....... 340/134; 240/7.55; 116/56

[56] References Cited
UNITED STATES PATENTS
2,788,763   4/1957   Ries .............................. 240/7.55 X Primary Examiner—Donald J. Yusko
Attorney, Agent, or Firm—Casimir A. Miketta

[57] ABSTRACT

A novel combination of driving means and resilient, self-aligning torsion-transmitting coupling means, whereby a bicycle or similar wheeled vehicle is provided with a rotatable, attention-compelling signal means utilizing reflected or transmitted light. The rugged, shock-absorbing construction is particularly designed to withstand the rough and casual treatment to which these lightweight vehicles are often subjected.

6 Claims, 4 Drawing Figures

ROTATING BICYCLE SIGNAL AND DRIVE THEREFOR

Bicycles, tricycles, and even motorcycles, are often operated in a supercilious, disdainful and careless manner over rough terrain and delicate instrumentation attached thereto is apt to have a short effective life. Although rough treatment is not conducive to long life of a normal signaling device for a bicycle, a good signaling device may assure long life for the operator of a bicycle. This invention is particularly directed to signaling devices for use on such sporty, lightweight, wheeled vehicles, such as bicycles, the construction of the signaling devices solving the problems created by rough terrain, rough usage and the casual and careless treatment to which these lightweight vehicles are often subjected and at the same time effectively signaling the presence of the vehicle to the surroundings.

Pursuant to the present invention, as described in detail hereafter, bicycles and the like may be provided with rotatable signaling devices which reflect incident light to call attention or with signaling devices employing a source of light and lens and/or prisms to amplify, direct and cause the light source to attract attention. Both of these signaling devices are characterized by the provision of resilient means for transmitting rotation of a bicycle wheel to a virtually vertical shaft in a unique manner involving a brush wheel with resilient, radially extending, bristle-like elements which receive deflective forces from the spokes of the wheel. Another shock-absorbing feature embraced hereby lies in the use of resilient torsion-transmitting couplings between rotating portions of the signal and drive-shafting and the provision of yieldable, resilient, connections which preclude injury to more delicate portions and elements, due to shocks, blows, falls, etc.

An object of my invention is to provide a relatively inexpensive, simple, fool-proof and virtually unbreakable combination of elements adapted to be readily installed on a wheeled vehicle, such as a bicycle, and provide an efficient, long-lasting signal device for its operator.

Another object is to provide novel means for translating rotation of a traction wheel of a bicycle into a rotation of a signaling device without jars, instantaneous impact loads or forces without subjecting light filaments or delicate instruments to shock, breakage, etc.

Various other objects, advantages and attributes of this invention will become evident to the users of the herein-disclosed teachings and to those skilled in the art from the following description of two modifications embracing the novel arrangements, elements and combinations embraced hereby. In order to facilitate description, reference will be had to the appended drawings in which.

Figure 1:
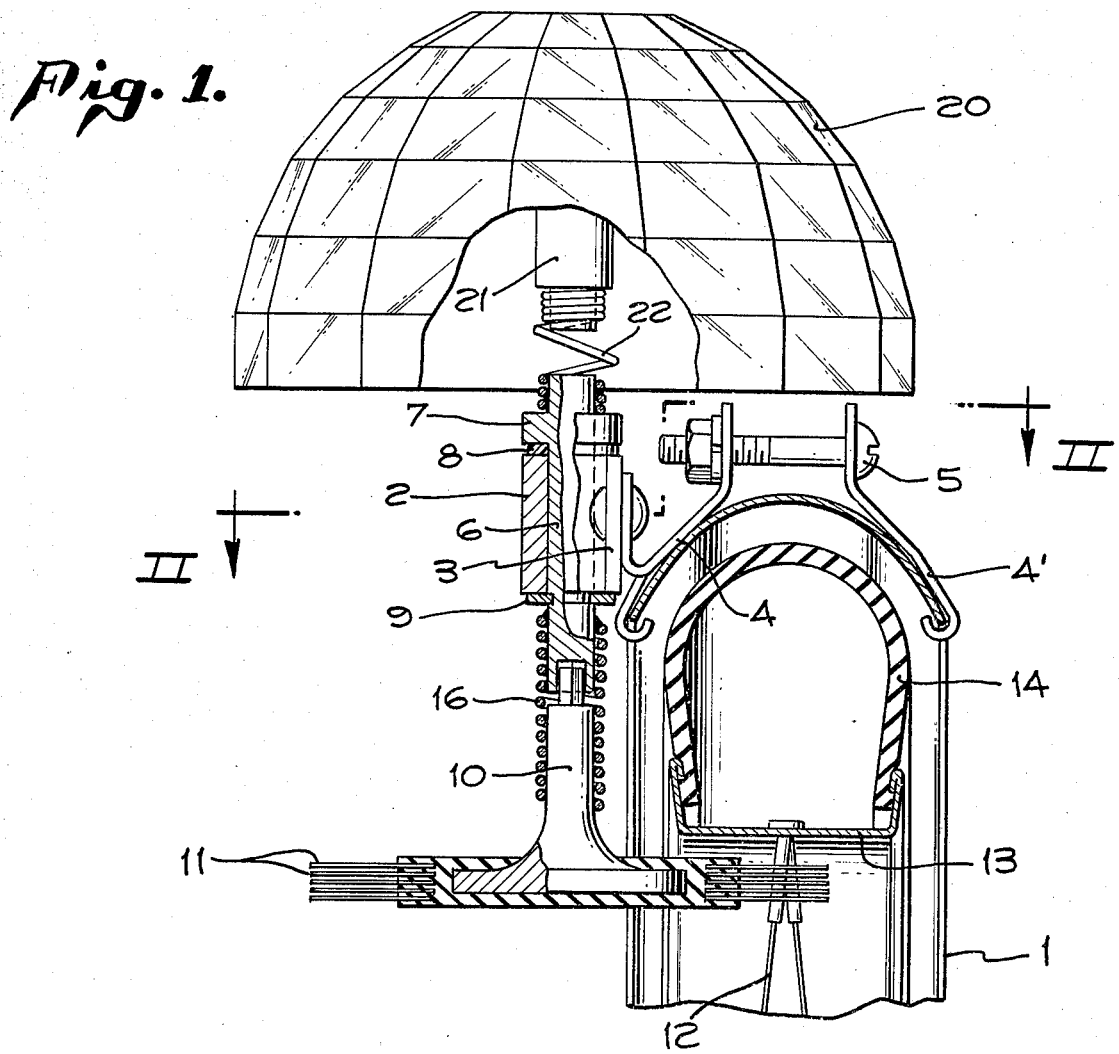
FIG. 1 is a rear elevation, partly broken away and in section, of a rotatable, reflector-type signaling device as installed over the front fender and wheel of a bicycle.
Figure 2:
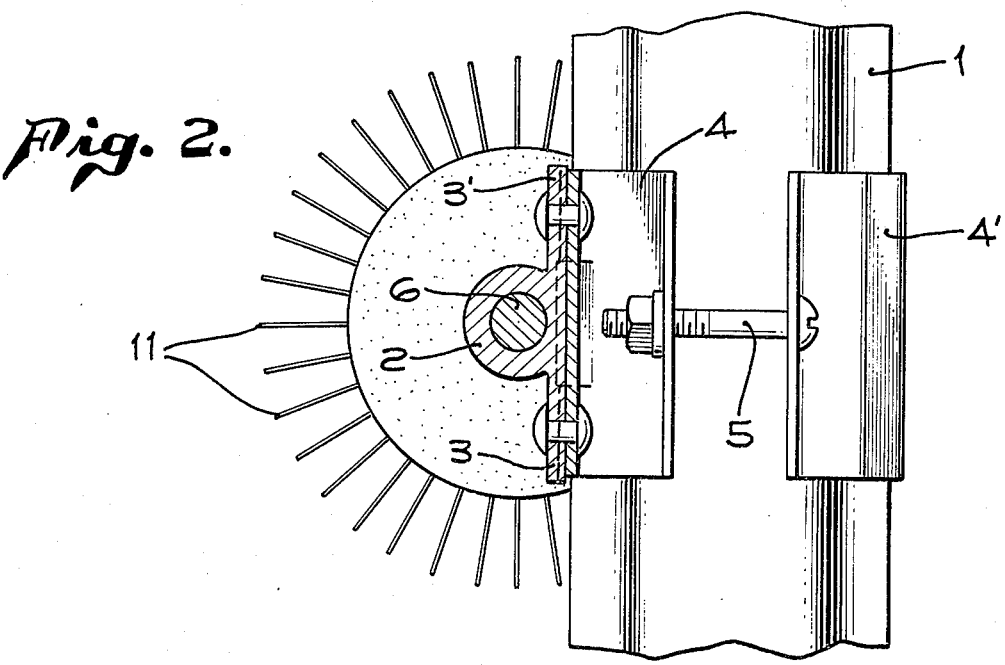
FIG. 2 is a horizontal section taken along plane II—II of FIG. 1.

Since the construction of bicycles, tricycles and motorcycles is common knowledge to all children of school age, the description herein given will be limited to only the novel combinations of elements embraced by my invention; the term "stationary members" of the vehicle as used herein refers to the frame, fenders and handlebar or other non-rotating portion of the vehicle.

Since it appears desirable that a signaling device be in front of the operator or rider of a bicycle, it can be mounted on the front yoke or front fender and the installation on the fender 1 is illustrated in the drawings. As there shown, means for journaling a vertical shaft comprise a journal 2 provided with lateral wings 3 and 3' which are connected to bracket portions of fender clamp anchor 4 by means of rivets, lock nuts and bolts or other connectors. Clamp anchor 4 has a lip which grasps one edge of the fender and is connected to opposing clamp 4' by a tension bolt 5, thereby holding journal means 2 with its bore in virtually vertical position.

Journaled in the bore of journal 2 is a shaft 6 which carries a stop ring 7 mounted on or integral with the shaft. The stop ring may rest upon an antifriction washer 8 (of "nylon" or "teflon") supported by the upper end of journal 2. A snap ring 9 adjacent the lower end of the journal may be used to restrict axial movement of the shaft in the journal.

Pursuant to the concept herein disclosed, resilient means for transmitting rotation of a bicycle wheel to shaft 6 are provided. Such means may comprise a brush wheel having hub and stub shaft 10 and radially extending, resilient, but force-transmitting bristles 11 which are struck by spokes 12 of the bicycle wheel adjacent its rim 13 which carries tire 14.

A resilient, shock-absorbing, torsion-transmitting coupling is provided between the driving means (brush wheel) and the shaft 6. To simplify installation and overcome any misalignment, the lower end of shaft 6 is provided with a polygonal socket (square or polygonal in cross section) and the end of brush wheel hub shaft 10 is provided with an undersized pin of similar cross section sloppily fitting such socket and which transmits torque. In addition, the hub stub shaft and lower end of shaft 6 are connected by means of coiled spring 16 whose ends are connected to 10 and 6, this spring maintaining contact between these rotating sections transmitting torque, absorbing axial jars and smoothing out the revolutions.

The signal means shown in FIG. 1 may be a generally hemispherical, suitably faceted, substantially hollow object 20 made of a tough synthetic polymer with a reflective surface and provided with an inwardly and downwardly extending stud 21. A resilient, shock-absorbing, torsion-transmitting coupling is preferably provided between this stud and the upper end of shaft 6; the example illustrated provides a spring 22 with tightly coiled end portions in fixed engagement with the stud and shaft and an intermediate, high pitched portion to absorb shocks in the vertical direction, etc. It is to be understood that other forms of coupling, preferably resilient, can be used and are contemplated to be within the scope of this invention.

From the description given, it will be evident that the various elements can be supplied as a kit to the owner of a bicycle and easily installed, or be an original part of a newly purchased bicycle. Rotation of the wheel is converted into rotation of the shaft not by friction but by the rapidly successive impulses given the bristles 11 by the spokes 12 of the wheel. The bristles are preferably made of extruded synthetic polymeric compositions, such as polyethylene, polyamide and polystyrene or acrinonitrile which are strong, resilient and non-abrasive, thereby not imposing wear upon the spokes. These bristles may be embedded in a hub of hard rubber or plastic. The drive is flexible, self-aligning, quiet, simple and long-lasting.

Figure 3:
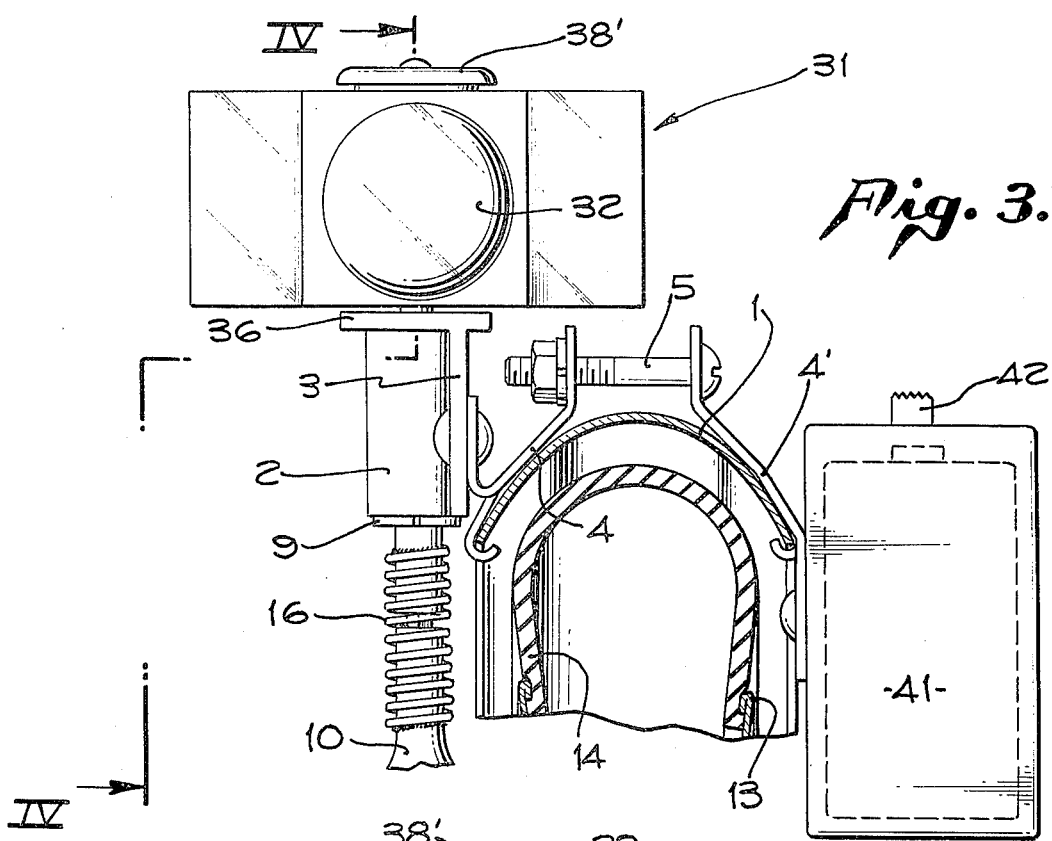
FIG. 3 is a rear elevation, partly in section, of a modified form of rotating signal.
Figure 4:
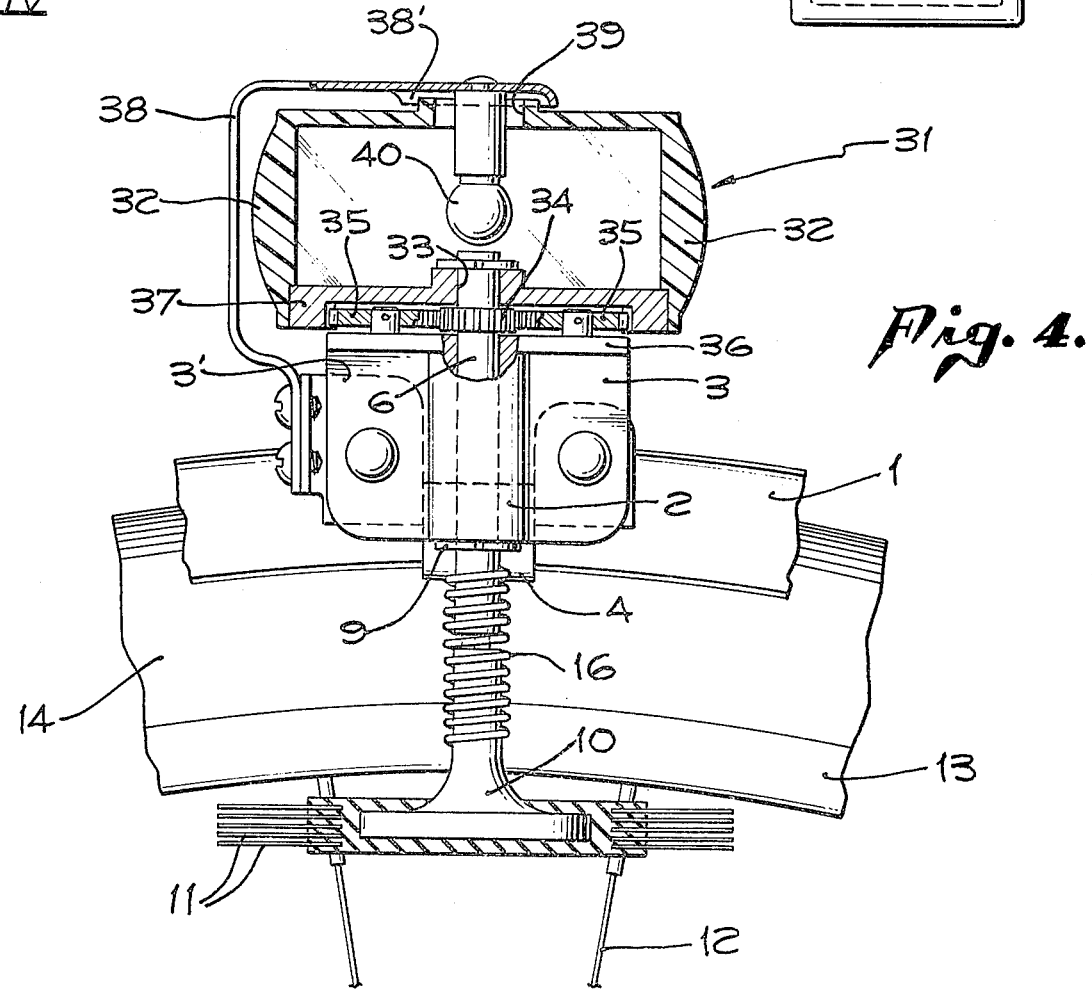
FIG. 4 is a vertical section taken along the axis of rotation as indicated by plane IV—IV in FIG. 3.

A modification of the above, illustrating the adaptation of the drive to a signal provided with a self-contained light source is shown in FIGS. 3 and 4 and like parts will be referred to by like numbers to facilitate comprehension.

Instead of a reflector, the virtually vertical shaft 6 rotates a moulded, hollow lamp housing 31 having two, three or four equi-angularly disposed lenses 32 formed in its outer wall. This lens housing may be journaled on shaft 6 at 33. The shaft 6 may carry a gear 34 in mesh with idler spur gears 35 journaled on a pin mounted in a top plate 36 of the journal 2 and its wings 3. The outer surface of the lower wall of housing 31 is recessed to receive gear 34 and gears 35, the inner wall of such recess being circular in plan and provided with an internal ring gear 37 adapted to mesh with gears 35, thereby forming a speed-reduction gearing whereby the rotational speed of 31 is reduced with respect to rpm of shaft 6. other speed-reducing systems may be employed.

The journal 2 with its wings 3 and 3' and top plate 36 supports a lamp standard 38 having an enlarged circular end portion 38' in the form of an inverted shallow dish adapted to cover an axial port 39 in the top wall of housing 31. The cover 38' carries a lamp socket for a light source 40 supplied with electrical energy from a suitable battery pack 41 carried by the fender clamp, the pack being provided with switch 42 for controllable operation of the light source.

From the above description it will be appreciated that the rotating signal attracts attention much more effectively than the single white light sometimes installed and that the construction disclosed is light in weight but silent and efficient in operation. The shock-absorbing connections and mountings insure long life, even under rough usage.

I claim:

1. A rotatable signaling device for a bicycle or the like, comprising:
   resilient means for translating and transmitting rotation of a bicycle wheel about a horizontal axis into rotation of a shaft about a virtually vertical axis;
   journal means for supporting a shaft for rotation about a virtually vertical axis, said journal means including means for connecting the journal means to a bicycle frame;
   a shaft in said journal means;
   a light-transmitting and reflecting signal mounted for rotation by said shaft about a vertical axis;
   and a resilient, shock-absorbing torsion-transmitting coupling between the signal and said shaft.

2. A rotatable signaling device as stated in claim 1, wherein the resilient translating and transmitting means include
   a brush wheel provided with a multiplicity of radially extending, resilient bristle elements adapted to be contacted by spokes of a tired bicycle wheel adjacent a rim thereof,
   said brush wheel having a stub shaft in approximate alignment with the shaft in said journal means.

3. A rotatable signaling device as stated in claim 2, including
   a loosely fitting pin and socket connection between said shaft and stub shaft.

4. A rotatable signaling device as stated in claim 2, including
   a coiled spring connection between said shaft and stub shaft.

5. A rotatable signaling device as stated in claim 2, wherein the light-reflecting signal is a hollow body provided with a faceted surface.

6. A rotatable signaling device for use on a bicycle or similar vehicle, comprising:
   resilient means for translating and transmitting rotation of a bicycle wheel about a horizontal axis into rotation of a shaft about a virtually vertical axis;
   journal means for supporting a shaft for rotation about a virtually vertical axis, said journal means including means for connecting the journal means to a bicycle frame;
   a shaft in said journal means;
   a signal housing including lenses supported by the journal means for rotation about a vertical axis, the bottom of said housing including a gear reduction train adapted to be driven by said shaft;
   light standard means, supported by said journal and frame-connecting means, positioning a light source in said signal housing;
   and selectively operable means for supplying electrical energy to said light source within said rotatable signal housing.

* * * * *